Patented Dec. 23, 1924.

1,520,384

UNITED STATES PATENT OFFICE.

WALTHER BAUERSFELD, OF JENA, GERMANY, ASSIGNOR TO THE FIRM CARL ZEISS, OF JENA, GERMANY.

CINEMATOGRAPHIC APPARATUS.

Application filed August 13, 1921. Serial No. 492,131.

(GRANTED UNDER THE PROVISIONS OF THE ACT OF MARCH 3, 1921, 41 STAT. L., 1313.)

*To all whom it may concern:*

Be it known that I, WALTHER BAUERSFELD, a citizen of the German Empire, residing at Jena, Germany, have invented a new and useful Cinematographic Apparatus (for which I have filed an application in Germany, May 23, 1919; Switzerland, June 11, 1920, Patent 87,590; Italy, June 21, 1920; France, July 2, 1920, Patent No. 518,726; England, July 5, 1920; and Austria, July 9, 1920), of which the following is a specification.

The present invention relates to a device for compensating the movement of the image by means of uniformly rotating optical parts, for use in a cinematographic apparatus for projecting, or taking photograms respectively, having a uniformly traversed film. Several devices of this kind have been described heretofore, but they solve the problem of producing a stationary image of the moving film but imperfectly. Either the horizontal centre line of the image is stationary only, while the upper and lower parts of the image move perpendicularly to the image-plane, or the whole image keeps rocking to and fro in the depth-direction, or in the lateral direction.

According to the invention the said drawbacks are obviated by fitting the optical compensating device with two prism-rings, which are so disposed as to be rotatable about two axes parallel to one another, and both of which contain the same number of rhombic prisms disposed in such a manner that the surfaces of entrance and emergence of the prisms are perpendicular to the said axes, and that the prisms of each ring are contiguous to one another in their radially disposed limiting planes, provided that all the prisms are constructed in such a manner that to the rays entering them parallel to the said axes, they impart the same parallel displacement.

Figure 1:
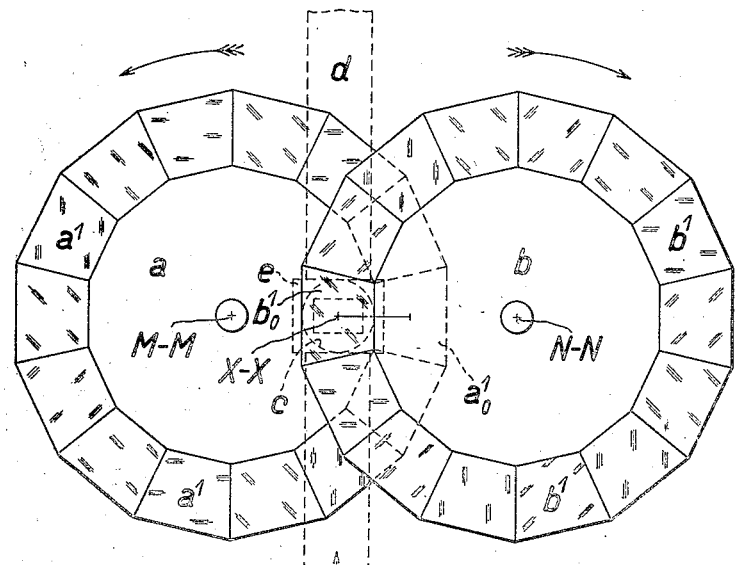
Figure 2:
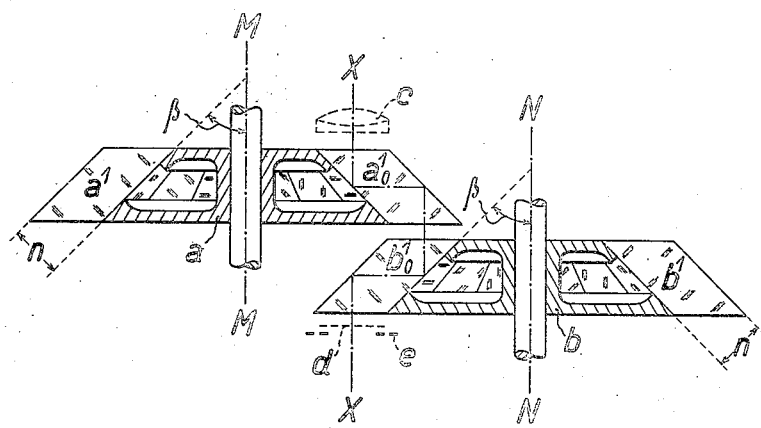
Figure 3:
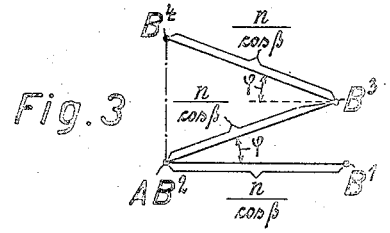

A particularly suitable form of construction will be obtained by disposing two identical rings of prisms in such a manner that their respective axes of rotation are situated at opposite sides of the optical axis of the cinematogaphic apparatus. The actuating mechanism of the two rings has in this instance to be so chosen that the rings rotate in an opposite sense to one another, and that they are consistent to each other as regards their angular velocities. In the annexed drawing: Figs. 1 and 2 show a constructional example of the invention in elevation, and in a sectional plan respectively. Fig. 3 shows diagrammatically the effect of the rhombic prisms.

In Figs. 1 and 2 the two identical rings of prisms are marked $a$ and $b$ respectively, M—M and N—N denote their respective axes of rotation, which are situated at opposite sides of the optical axis X—X of the cinematographic apparatus, are parallel to the said axis, and lie with it in one and the same plane. Each ring contains 14 rhombic prisms $a^1$ and $b^1$ respectively, the surfaces of entrance and emergence of which are perpendicular to the axes of rotation M—M and N—N respectively, and which prisms are in contact with one another in their radially disposed limiting surfaces. The objective is marked $c$, the film $d$, and the film-window $e$.

Fig. 3 shows the displacement of a ray A emerging from a stationary object-point and entering the rhombic prisms of the rings $a$ and $b$, perpendicularly to the entrance surfaces thereof, the figure being a section perpendicular to the ray and showing the displacement in different relative positions of the rings $a$ and $b$. When the central principal sections of the two prisms $a_0^1$ and $b_0^1$ which conjointly participate in the displacement, occupy—as is shown in Fig. 1—their central position, i. e. the position in which they lie in the plane determined by the axes of rotation M—M and N—N, the ray A becomes displaced by means of the prism $a_0^1$ to $B^1$, and from there by means of the prism $b_0^1$ to $B^2$. If $n$ be the distance apart of the reflecting surfaces of the rhombic prism and $\beta$ the angle which the said surfaces embrace with the axis of rotation of the ring of prisms, the following equation holds good:

$$AB^1 = B^1B^2 = \frac{n}{\cos \beta},$$

hence, $B^2$ coincides with A. Besides, $AB^1$ is parallel to the straight line which intersects the axes of rotation M—M and N—N perpendicularly. If, on the other hand, the principal sections of the prisms $a_0^1$ and $b_0^1$ are displaced, each with respect to its central position by the same angle $\phi$ in the direction as indicated by respective arrows in Fig. 1, the ray A becomes displaced by means of the prism $a_0^1$ to $B^3$, and from there by means of the prism $b_0^1$ to $B^4$. In that case $$AB^3 = B^3B^4 = \frac{n}{\cos \beta},$$

and, moreover, $AB^3$ as well as $B^3B^4$ are inclined with respect to $AB^1$ by the angle $\phi$. It may easily be proved that $AB^4$ is perpendicular to $AB^1$, and has the value $$\frac{2n}{\cos \beta} \sin \varphi.$$

Hence, when the ray A emerges from a stationary image-point, and the rings of prisms are rotated in opposite directions, provided the angular velocities are the same, a displacement is imparted which is rectilinear, and perpendicular to the plane determined by the axes of rotation of the rings of prisms, and which is proportional to the sine of the angle of rotation of the said rings. If the film be made to move at the said non-uniform speed, the rings of prisms produce, as is required, a stationary image of the moving film. Likewise, a stationary image could be produced, on the film being traversed at a uniform speed, if either the corresponding non-uniform motion were to be imparted to the rings of prisms, or if the objective of the cinematographic apparatus were to be periodically moved up and down, or, still, if between the film and the objective a plano-parallel glass plate were to be introduced which periodically tips up and down. From reasons of expediency, generally the speed of the rings of prisms as well as that of the film will be chosen so as to be uniform, in such a manner that the speed of the film is equal to the circumferential velocity which the ring of prisms adjacent to the film has at that distance from its axis of rotation in which the optical axis X—X of the cinematographic apparatus lies. To be true, in that case the image formed is not perfectly stationary. However, the movements of the image are practically unnoticeable, since the single rhombic prisms are only effective during their passage through comparatively small angles of rotation.

In cinematographic apparatus for projection having an optical compensation in front of, as well as behind the film, the compensating device disposed in front of the film, which serves for displacing the rays of light destined for illuminating the film in such a manner that they do not get displaced relatively to the film, may, with advantage, also be constructed in accordance with the invention.

I claim:

In a cinematographic apparatus for a uniformly traversed film, two rings of prisms rotatable about axes parallel to each other, the said rings containing each a similar number of rhombic prisms so disposed that their surfaces of entrance and emergence are perpendicular to the said axes, and that the prisms of each ring are contiguous to each other in radial limiting planes, all the prisms being so constructed as to impart to the rays entertaining them parallel to the said axes, the same parallel displacement.

WALTHER BAUERSFELD.